Figure 1:
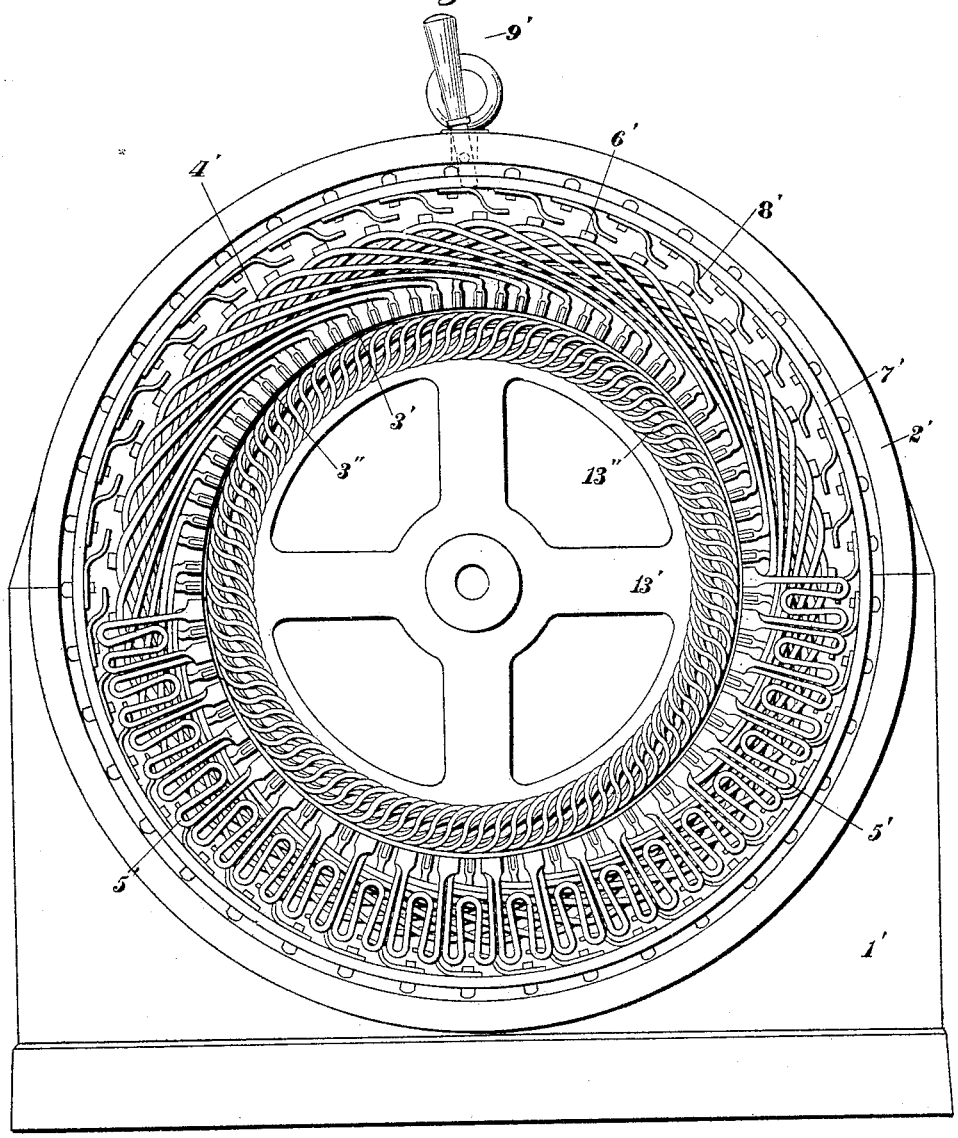

(No Model.) 4 Sheets—Sheet 1.

B. G. LAMME.
ALTERNATING CURRENT MOTOR.

No. 582,132. Patented May 4, 1897.

WITNESSES:
Ethan D. Dodds
Hubert C. Tener

INVENTOR.
Benj. G. Lamme
BY
Terry, MacKaye & Carr
ATTORNEYS.

(No Model.)　　　　　　　　　　　　　　　　　　4 Sheets—Sheet 2.
B. G. LAMME.
ALTERNATING CURRENT MOTOR.
No. 582,132.　　　　　　　　　　　　　Patented May 4, 1897.
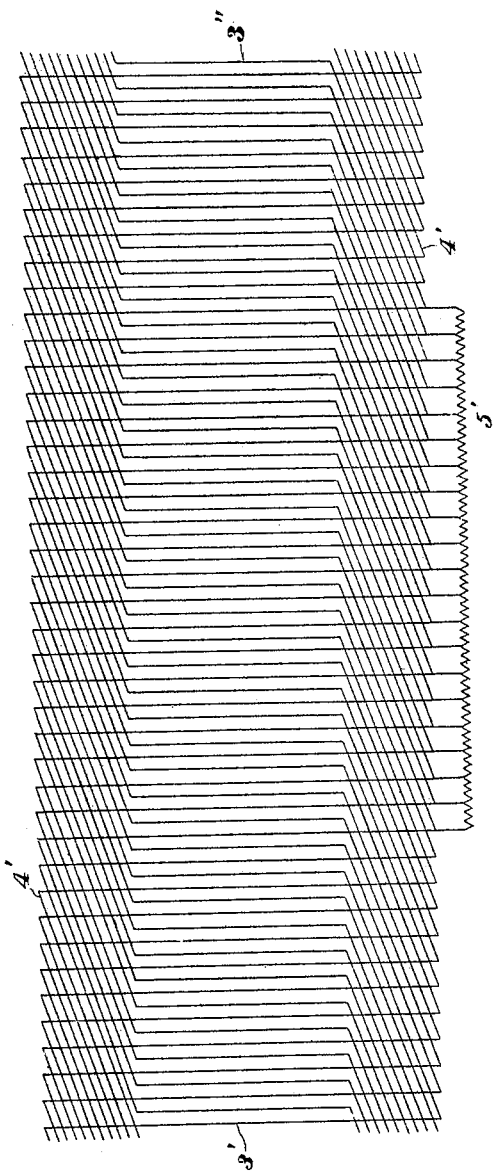

(No Model.) 4 Sheets—Sheet 3.
B. G. LAMME.
ALTERNATING CURRENT MOTOR.
No. 582,132. Patented May 4, 1897.
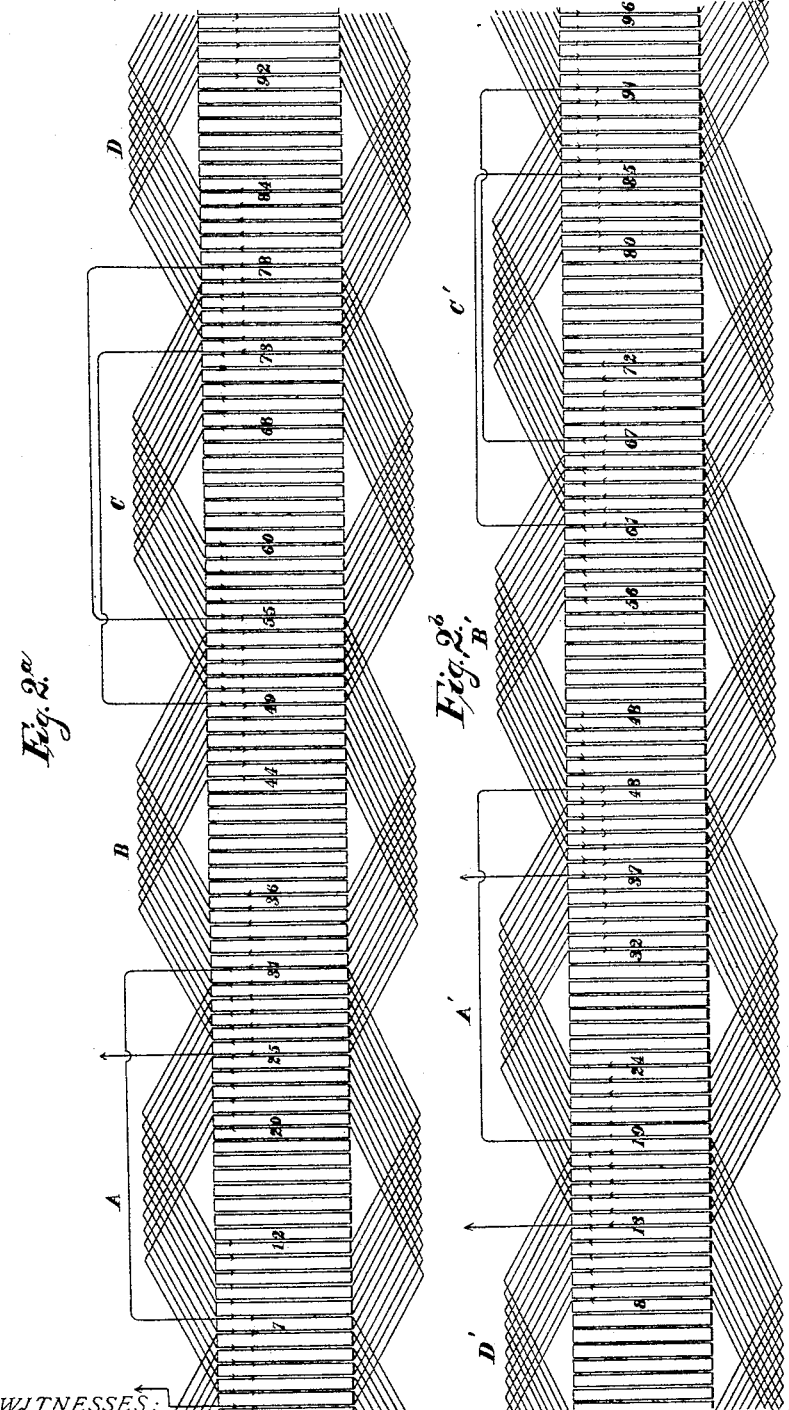
WITNESSES:
Ethan I. Dodds
Hubert C. Tener
INVENTOR.
Benj. G. Lamme
BY Terry, MacKaye & Carr
ATTORNEYS.

(No Model.) 4 Sheets—Sheet 4.
B. G. LAMME.
ALTERNATING CURRENT MOTOR.
No. 582,132. Patented May 4, 1897.
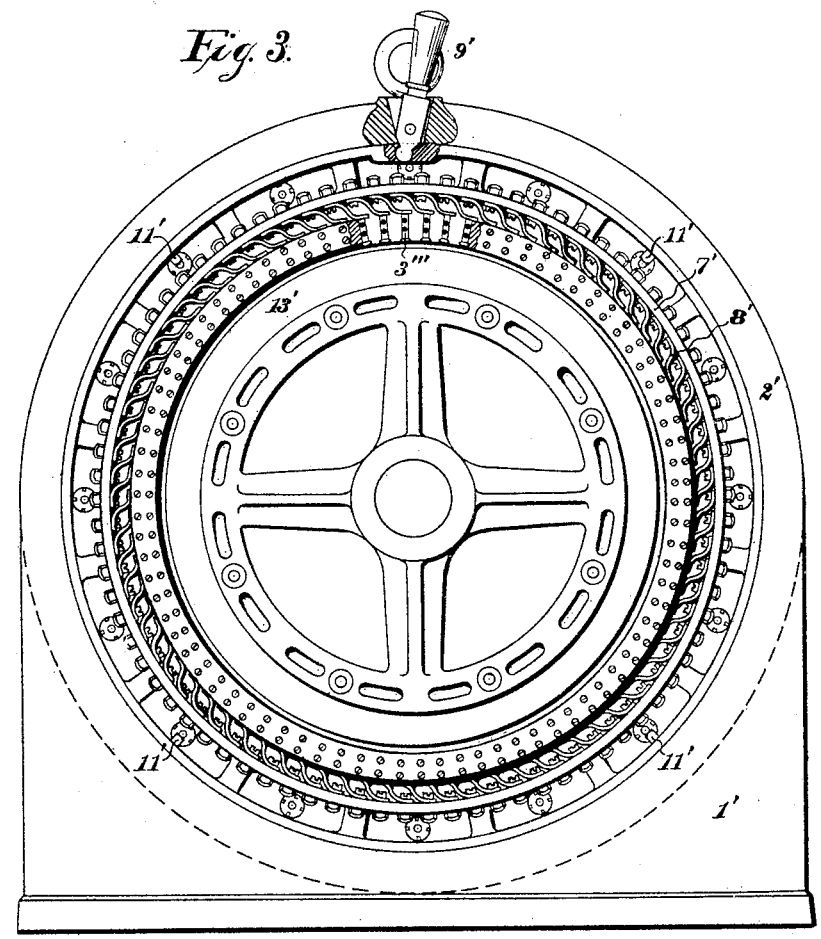
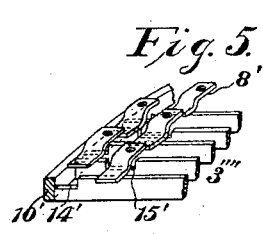
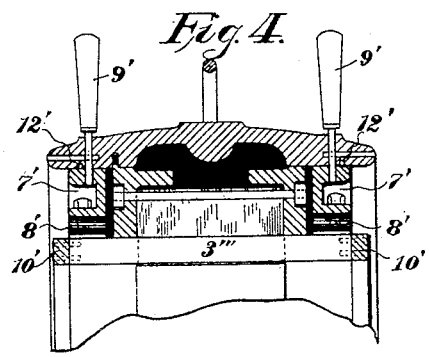
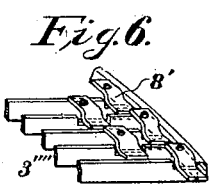
WITNESSES:
Ethan D. Dodds
Hubert C. Tener
INVENTOR
Benj. G. Lamme
BY
Terry, MacKays & Carr
ATTORNEYS

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

ALTERNATING-CURRENT MOTOR.

SPECIFICATION forming part of Letters Patent No. 582,132, dated May 4, 1897.

Application filed October 30, 1895. Serial No. 567,416. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Alternating-Current Motors, of which the following is a specification.

My invention relates to electric motors, and more particularly to that class of motors in which alternating currents differing in phase are supplied to the winding of one of the members in such manner as to produce revolving magnetic poles, which in turn produce corresponding magnetic poles in the other member by reason of induced currents set up in a closed-circuit winding applied thereto, such motors being generally known as "non-synchronous induction-motors." In this class of machines the multiphase inducing currents may be supplied either to the stationary or to the rotating member; but I have found it desirable in practice to supply the currents to the rotating member, thus making it the field-magnet or primary member, and to provide the outer stationary member with a closed-circuit winding, thus making it the armature or secondary member. This arrangement is regarded as preferable, mainly on account of the better ventilation secured. In motors of this character the best conditions for starting are attained by introducing considerable resistance into the closed or induced circuit, and thus keeping down the first rush of current therein. When full speed is attained, however, the resistance should be reduced as much as possible. It becomes necessary, therefore, to provide some means for cutting out or short-circuiting the resistance after it has served its purpose in starting.

One of the objects of my present invention is to provide a starting resistance of the necessary value which shall be normally included in the circuit with the armature-winding, and also to provide a switching device which shall be movable into engagement with the armature-winding in order to short-circuit the resistance when the motor reaches normal speed.

A further object of my invention is to provide a primary member or field-magnet which shall have a substantially uniform pole strength and which will consequently exert a uniform maximum induction upon the secondary member. I accomplish this result by providing electrically independent windings, one for each phase of current and each composed of as many groups of coils as the machine has poles and extending each group of coils over a space wider than the pitch, thus producing a magnetization curve which closely approximates the sinusoidal form, provided the electromotive-force wave is of that form.

Referring now to the drawings, Figure 1 is a rear end elevation of a machine constructed in accordance with my invention, the field-magnet and ring-plate being removed to show the winding; and Fig. 2 is a diagrammatic development of the secondary or armature winding. Fig. 2$^a$ is a diagrammatic development of the primary member or field-magnet winding for one phase of current, and Fig. 2$^b$ is a corresponding view of the winding for the other phase of current. Fig. 3 is a view similar to Fig. 1 of a machine embodying a modified form of secondary winding. Fig. 4 is a sectional detail view of a portion of the armature and short-circuiting switches shown in Fig. 3, and Figs. 5 and 6 are detail views in perspective of a modification of armature-conductors and switch-brushes.

Reference being now had to Figs. 1 and 2 of the drawings, 1' is the frame of the machine, the portion 2' of which is the ring-shaped armature-core provided with eighty-two slots around its inner periphery, in which are located the alternately-arranged long conductor-bars 3' and short conductor-bars 3". The short conductor-bars 3" are respectively connected with the long bars 3' by means of the connecting-conductors 4', so as to form a continuous closed-circuit winding. These connecting-conductors are soldered to the ends of the bars 3' and 3" and are alike in construction and arrangement at both ends of the machine, except that those at the end of the machine (shown in Fig. 1) span twenty bars, while those at the opposite end span twenty-two bars. With this arrangement of armature-conductors a four-pole field-magnet is necessary, as will be readily understood. It will also be understood that the armature-conductor bars may be so connected as to form a winding adapted for a field-magnet having a different number of poles by making the connectors of such length as to span the requisite number of bars, and that the number of slots and corresponding bars may be varied as may be found necessary or desirable in practice.

Suitably fastened to the ends of several of the long bars 3', so as to make good electrical connection therewith, are several resistance-pieces 5', twenty of such resistance-pieces being shown in the drawings. They may be constructed of any conducting material of high resistance, but preferably of iron, as this is inexpensive and entirely satisfactory in its operation. The number and size of these resistance-pieces will of course depend upon the character of the particular machine to which they are applied. With a four-pole machine like that shown in the drawings it is obvious that twenty resistance-pieces connected together and to twenty-one consecutive long bars at one end of the armature, as shown, will provide the nesessary starting-resistance for the entire armature-circuit.

It will be readily understood that practically the same result may be effected by employing ten resistance-pieces and connecting them to the corresponding ends of twenty-one consecutive bars. As it is much more convenient to attach the resistance-pieces only to the ends of the long bars I prefer the arrangement shown, in which a space double the pitch is covered. It is obvious that the resistances might be continued all the way around the armature, if desired, but the number shown is ordinarily all that is necessary or desirable.

Soldered to each connecting-conductor 4', at the point nearest the outer periphery of the core, is a contact-block 6'. Mounted in the frame of the machine, so as to be capable of having a limited movement around the axis of the machine, is a ring 7', of good conducting material, to which are bolted contact-brushes 8', these brushes being in the same vertical plane as the contact blocks or pieces 6'. A handle 9' is pivoted in a slot in the upper portion of the frame of the machine and its lower end is connected to the ring 7', so that as the handle is moved back and forth the contact-brushes 8' will be either brought into engagement with the contact-blocks 6' or moved out of engagement therewith.

It will be apparent from the foregoing description that when the brushes are out of contact with the blocks 6', as shown in Fig. 1, the starting-resistance will be in circuit with the armature-winding, this relation of the parts being maintained until the motor reaches normal speed. When full or normal speed is attained, the ring 7' is rotated a sufficient distance to bring the brushes 8' into engagement with the blocks 6', thus short-circuiting the starting-resistance. It will be understood that approximately the same result may be effected by means of a less number of blocks or contact-pieces 6' and brushes 8', twenty of each of these devices, if properly located with reference to the resistance-pieces 8', being operative for the purpose intended. Hence I do not desire to be understood as limiting my invention to a construction in which a brush and contact-block is employed for every connector 4'.

The primary member or field-magnet 13' is provided with a winding 13'', which will be particularly described with reference to Figs. $2^a$ and $2^b$. In the particular field-magnet shown the core is provided with ninety-six slots, but a different number, suitable to the number of poles and the number of coils to each pole, may be employed, as may be found desirable. For example, one-half or one-fourth the number shown would be suitable for a four-pole machine. Each coil preferably comprises several turns, three being indicated in Fig. 1, and each slot contains one side of each of two coils, one above the other, as is usual in armature construction. For convenience of illustration the portions of the two coils in the same slot are indicated in Figs. $2^a$ and $2^b$ as located side by side. The coils shown in Fig. $2^a$ constitute the winding for one phase and those in Fig. $2^b$ the winding for the other phase, these two windings being identical except as regards location. The coils are separately wound upon suitable forms and are all exactly alike. Each group contains twelve coils, and each coil spans twenty slots. For example, in group A the coils are in slots 1 to 12 and 20 to 31, all connected in series, as shown, to form a continuous winding. The coils of group B are in slots 25 to 36 and 44 to 55 and are also connected in series. The coils of group C are in slots 49 to 60 and 68 to 79 and those of group D in slots 73 to 84 and 92 to 7. The ends of the four groups of coils are brought out and connected as follows: The end of coil A from slot 31 is connected with the end of coil D from slot 7, the end of coil B from slot 55 with the end of coil C from slot 79, the end of coil C from slot 49 with the end of coil D from slot 73. The ends of coils A and B from slots 1 and 25 are left free to be connected to the corresponding collector-rings for this phase. Instead of connecting the groups in series, as shown, they may be in parallel, if desired.

The direction of current flow at any given instant will be apparent from the arrow-points on the drawings. It will also be observed that when this winding is in position each pole comprises seven slots, each of which contains conductors belonging to two adjacent groups of coils, and five slots on each side, each of which contains only one conductor, and that between each two consecutive poles seven slots are left empty.

The winding for the other phase (shown in

Fig. 2$^b$) comprises groups A', B', C', and D', group A' occupying slots 13 to 24 and 32 to 43; group B', slots 37 to 48 and 56 to 67; group C', slots 61 to 72 and 80 to 91, and group D' slots 85 to 96 and 8 to 19, the coils of each group being connected in series the same as those belonging to the first phase. The several groups are connected as follows: The end of group A' from slot 43 is connected to the end of group D' from slot 19, the end of group B' from slot 67 to the end of group C' from slot 91, the end of group D' from slot 85 with the end of group C' from slot 61, and the ends of groups A' and B' from slots 13 and 37 are carried out for connection with the corresponding collector-rings for this phase. It will be seen that in each winding each coil embraces a space represented by twenty slots, which is four less than the pitch.

If the groups constituting the winding for the first phase are connected in parallel, it is obvious that those shown in Fig. 2$^a$ must be so connected.

The direction of current at any given instant which determines the number and location of the poles will be apparent from the arrow-points in the drawings. It will also be observed that the double and single arrangement of conductors and empty slots is the same as that which has already been described with reference to the other phase winding, except that the empty slots in this figure are the filled slots in Fig. 2$^a$, and vice versa.

It will be understood from the foregoing illustration and description that a practically uniform maximum inductive action is secured, and that the magnetization produced by each winding and also that produced by the combined action of both windings will be that of a wave substantially sinusoidal in form, provided the electromotive-force wave is of that form. The number of filled and the number of empty slots which will be present with only one of the windings will of course vary with the number of slots in the core and the number of poles, but in general each will preferably cover a space approximately equal to one-third of the pitch.

The winding above described is not only of great value by reason of the magnetic results secured, but it is also important and of great value by reason of its ready applicability to the core, its symmetrical arrangement, and the reduction in the amount of copper employed, and consequently in the resistance.

I desire it to be further understood that my invention is not limited to either the specific number or the arrangement of coils or groups of coils shown and described.

In Figs. 3 and 4 of the drawings I have shown an armature-winding suitable for use in connection with a field-magnet having any number of poles. In these figures the frame 1', slotted-ring armature-core 2', the ring 7', its brushes 8', and actuating-handle 9' are substantially the same in construction as the corresponding parts shown in Fig. 1. In this form of the invention, however, instead of employing alternately-arranged long and short armature conducting-bars and connecting-conductors 4', as in Fig. 1, I provide bars 3''' all of the same length and fasten a conducting-ring 10' to their ends at each end of the machine, one or both of these rings being made of high-resistance material. In small or moderate sized machines one of these rings 10' may be made of good conducting material, but in the machines of larger size it may be desirable to make them both of high-resistance material in order to secure the necessary amount of starting resistance in the armature-circuit. In this form of machine the brushes 8', carried by the rings 7', are so located as to engage with the outer edges of the armature conductor-bars 3''', adjacent to the rings 10'. In case only one high-resistance ring is employed, obviously only one ring 7' and one set of brushes 8' are necessary. Any suitable means may be employed for supporting the ring or rings 7' in such manner as to permit of shifting the same to bring the brushes into or out of contact with the conductor-bars, such means being shown in the present instance as screws or pins 11', which engage with an annular groove 12' in the frame of the machine. In Fig. 3 the field-magnet 13' is shown merely in outline, the winding being concealed by the end plate. It will preferably have the general construction shown in Figs. 1, 2$^a$, and 2$^b$, the number of poles being, however, immaterial.

In machines in which the number of conductor-bars employed in the armature is so large that adjacent bars are located very near together some special arrangement is necessary, whereby the brushes may be thrown completely off the bars when it is desired to introduce the starting resistance. I have shown an arrangement by means of which this may be effected in Figs. 5 and 6, each brush in Fig. 5 being shown in contact with its corresponding conducting-bar and in Fig. 6 each brush being shown as out of contact. In the construction here shown each bar 3'''' is provided either at one or at both ends, according to whether one or two switch-rings are employed, with a notch or recess in its upper edge, half of said conductors having notches 14' at the extreme end next the ring 10' and the alternate bars having notches 15', located at a distance from the ring 10 at least equal to the width of the brushes, the brushes being also alternated in position, so that each set will be in the same vertical plane as the corresponding notches or recesses. With this arrangement of notches and brushes it is apparent that when the ring 7' is shifted to include the resistance in circuit the brushes will move from the outer edges of the conductor-bars into the corresponding recesses in the adjacent bars.

While I have illustrated and described certain specific details of construction I desire it to be understood that these details may be varied within considerable limits without departing from the spirit and scope of my invention.

I claim as my invention—

1. An electric motor comprising an armature having a distributed winding, a starting resistance normally in circuit therewith, a short-circuiting device for said resistance surrounding said winding and means for moving said device into and out of direct engagement with the winding.

2. In an electric motor, an armature provided with a distributed winding and a starting resistance normally in circuit therewith, in combination with a ring provided with a set of contacts and movable circumferentially into direct engagement with said winding, whereby said resistance may be short-circuited.

3. An electric motor having a distributed winding on one of its members and a starting resistance or resistances normally in circuit therewith, in combination with a conducting-ring supported in an annular guideway and provided with a series of contact-brushes, and means whereby said ring and its brushes may be moved to short-circuit the starting resistance.

4. An electric motor having a distributed winding on its stationary member and a starting resistance normally in circuit therewith, in combination with a conducting-ring surrounding said winding and movable circumferentially, said ring having a series of contact-brushes for making direct engagement with said winding to short-circuit the starting resistance, and a handle extending outside the frame of the machine whereby the ring may be shifted.

5. In an electric motor, a stationary armature frame or core having slots in its inner side, conducting-bars seated in said slots, and two rings connecting the corresponding ends of said bars one of which is of high resistance, in combination with an annularly-movable ring mounted in said frame and provided with contact-brushes and means whereby said ring may be shifted to bring said brushes into or out of engagement with said conducting-bars.

6. In an electric motor, the combination with an annular, slotted armature frame or core provided with conducting-bars having their corresponding ends connected by conducting-rings, one of which is of high resistance, of a conducting-ring provided with contact-brushes, one for each armature-conductor, and engaging in an annular groove in the frame whereby it may be shifted to bring the brushes into or out of engagement with the armature-conductors.

7. In an electric motor, a stationary armature having bar-conductors, the corresponding ends of which are connected by rings one of which is of high resistance, the outer edges of said conductors being notched or recessed adjacent to the connecting high-resistance ring, in combination with a movable conducting-ring provided with contact-brushes for engagement with said conductor-bars.

8. In an electric motor, a set of bar armature-conductors having their corresponding ends connected by conducting-rings one of which is of high resistance and each of which has a notch or recess in its outer edge adjacent to the high-resistance ring, the notches or recesses in alternate bars being in circumferential alinement, in combination with an adjustable conducting-ring provided with two sets of contact-brushes respectively in the planes of the two sets of notches or recesses, the ring and its brushes being adjustable to insert or short-circuit the resistance.

9. In an electric motor, an armature provided with bar-conductors and with two high-resistance rings connecting the corresponding ends of said conductors in combination with two movable conducting-rings one for each end of the armature, and each provided with a set of contact-brushes for shifting the ring and its brushes to insert the corresponding resistance-ring in the armature-circuit or to short-circuit the same.

10. An induction-motor the secondary member of which is provided with a winding consisting of a series of bars the corresponding ends of which are connected by conducting-rings one or both of which are composed of high-resistance material, in combination with means movable into engagement with said bars and serving to short-circuit said ring or rings.

11. A polyphase induction-motor the primary member of which is provided with electrically-independent windings for the several phases respectively comprising as many groups of coils as the said member has poles, the peripheral core-space included between the sides of each coil being less than the pitch, and that embraced by each group of coils being greater than the pitch.

12. A polyphase induction-motor the primary member of which is provided with two electrically-independent windings each comprising as many groups of coils as the member has poles and the extreme width of each group being approximately one-third greater than the pitch.

13. In a polyphase induction-motor having a distributed secondary winding, a primary member having a slotted core and two electrically-independent windings in said slots each consisting of groups of coils the adjacent portions of the coils of adjacent groups of which occupy the same slots for a distance approximately equal to one-third of the pitch.

14. In a polyphase induction-motor, a primary member provided with two electrically-independent windings each of which comprises as many groups of coils as the said member has poles, the peripheral core-space embraced by each coil being less than the pitch, and that embraced by each group being greater than the pitch, in combination with a secondary member provided with a distributed winding and a starting-resistance, and means for introducing and short-circuiting said resistance.

15. In an induction-motor, a secondary member adapted, without modification, for use in conjunction with a primary member having any number of poles, in combination with a starting-resistance and an adjustable ring surrounding the secondary conductors and provided with means for making direct contact with each of said conductors and thereby short-circuiting said resistance.

In testimony whereof I have hereunto subscribed my name this 29th day of October, A. D. 1895.

BENJ. G. LAMME.

Witnesses:
H. A. CROOKS,
WESLEY G. CARR.